June 29, 1948.  J. A. BECKER ET AL  2,444,027
DIRECTLY HEATED THERMOCOUPLE
Filed Sept. 1, 1944

INVENTORS: J. A. BECKER
T. R. GRIFFITH
J. N. SHIVE
BY:
Walter C. Kiesel
ATTORNEY Patented June 29, 1948

2,444,027

UNITED STATES PATENT OFFICE 2,444,027

DIRECTLY HEATED THERMOCOUPLE

Joseph A. Becker, Summit, John N. Shive, North Plainfield, and Thomas R. Griffith, Madison, N. J., assignors to Bell Telephone Laboratories, Incorporated, New York, N. Y., a corporation of New York Application September 1, 1944, Serial No. 552,270

10 Claims. (Cl. 136—4)

This invention relates to thermocouples and more particularly to thermocouples sometimes known as colinear, directly heated or self-heated thermocouples in which the heating current passes directly through the couple.

Thermocouples have been used for the measurement of electrical power at relatively high frequencies. One of the difficulties encountered has been the attainment of sufficient sensitivity to allow the measurement of relatively low level power at these frequencies.

An object of this invention is to increase the sensitivity of colinear or directly heated thermocouples.

A feature of this invention resides in concentrating a large portion of the heating effect of the input power at the hot junction of the thermocouple.

Other and further objects and features of this invention will appear more fully and clearly from the following description of illustrative embodiments thereof taken in connection with the appended drawings in which.

Figure 1:
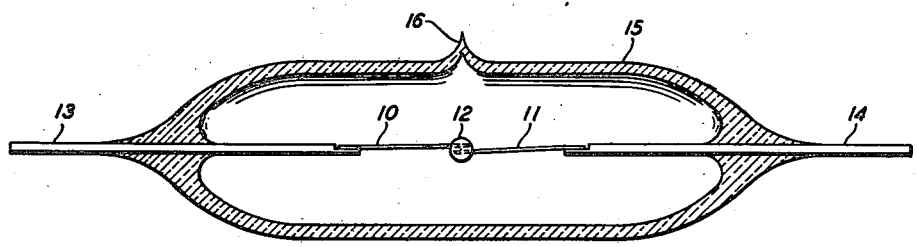
Fig. 1 shows in section one illustrative embodiment of this invention having a bead of relatively high resistance material at the hot junction.

In the device illustrated in Fig. 1, the thermocouple comprises metallic filaments or wires 10 and 11 of different materials. For example, one wire may be of an alloy comprising nickel and chromium and known as Chromel-P and the other an alloy of gold and palladium. Another combination may comprise an iron wire and one of a nickel-copper alloy known as constantan. Various other combinations of metals and alloys that give a thermal electromotive force may also be used.

The ends of the wires 10 and 11 may be embedded in spaced relation in a small bead or body 12 of a high resistivity material to form the hot junction of the thermocouple. A combination of graphite and glass, or of finely divided carbon and aluminum oxide may be employed, the latter combination having been found to be particularly suitable. The outer ends of the thermocouple elements 10 and 11 are secured respectively to conductors 13 and 14 and comprise the cold junctions of the thermocouple. These conductors 13 and 14 are relatively rigid and serve as supports for the thermocouple.

The thermocouple may be enclosed in an envelope 15 of glass or other suitable material. This envelope may contain air or may be evacuated and sealed off at the nipple 16. If an air-filled glass envelope is used the conductors 13 and 14 may comprise an alloy of nickel and chromium known as Nichrome. The Nichrome leads, which do not form a suitable seal with glass, may be cemented to the envelope 15 with sodium silicate, shellac, or other suitable material.

If the envelope is of glass and is to be evacuated, the conductors 13 and 14 should be of a material that makes an adequate seal with glass. An alloy of copper, nickel and iron, known as Cunife is suitable.

It has been found that a thermocouple of Chromel-P and a gold-palladium alloy works well in an atmosphere of air. If a couple of iron and constantan is used, an evacuated envelope is preferred to avoid the liability to corrosion in air of these thermocouple materials.

Figure 2:
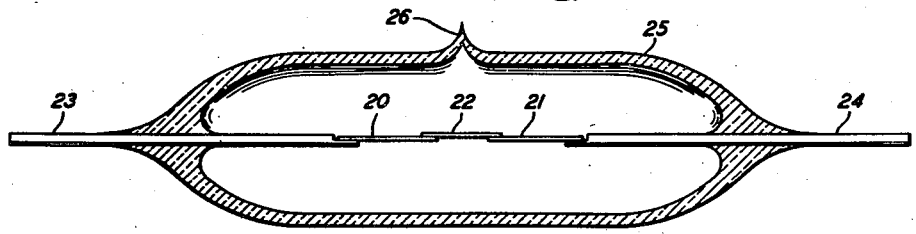
Fig. 2 shows in section another embodiment of the invention having a resistance filament at the hot junction.

The device illustrated in Fig. 2 is similar to that shown in Fig. 1, comprising thermocouple elements 20 and 21 of different metallic materials, support conductors 23 and 24 and an envelope 25 with a seal-off nipple 26. In this modification the element for concentrating the resistance at the hot junction comprises a filament 22 of carbon.

The thermocouple elements 10 and 11 of Fig. 1, and 20 and 21 of Fig. 2 may be secured to their respective support conductors by any suitable method or means, a satisfactory one being welding.

The wires from which the thermocouple elements are made and also the carbon filament 22 may be of the order of .0008 inch in diameter. The relatively stiff supporting wires 13, 14 and 23, 24 may be of the order of .03 inch in diameter. The units comprising such elements, when completely assembled, are relatively small, the envelope being of the order of ½ to ⅞ inch long and about .14 inch in outside diameter.

Figure 3:
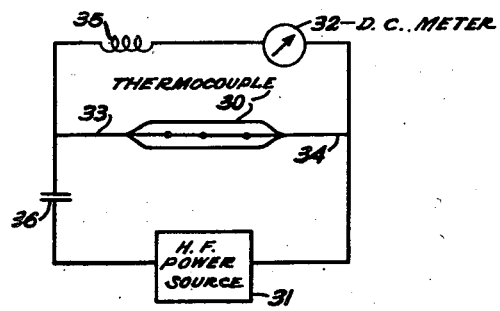
Fig. 3 shows a measuring circuit employing a thermocouple in accordance with this invention.

Colinear or directly heated thermocouples of the type described may be employed for measuring by connecting the source of high frequency power to be measured across the conductors 13 and 14 or 23 and 24 and also connecting a direct current measuring means such as a milliammeter across the same conductors, for example, as in Fig. 3, wherein the thermocouple 30 has a source of high frequency power 31 and a direct current meter 32 connected across the leads 33 and 34. The choke 35 and the condenser 36 restrict the alternating and direct currents to their respective circuits. Because of the concentration of resistance at the hot junction of the thermocouple, due to the presence of the auxiliary resistance means 12 or 22, a large portion of the power to be measured is converted into heat in the immediate vicinity of said junction, thereby greatly increasing the sensitivity of the device.

Although this invention has been disclosed by means of illustrative embodiments thereof, it is not intended that it be limited thereby, but by the scope of the appended claims only.

What is claimed is:

1. A thermocouple heated by the passage of current therethrough comprising two filaments of different materials capable of forming a thermoelectric junction, a portion of each filament being in close proximity to a corresponding portion of the other filament, and means for concentrating the heating effect of the heating current in the region of proximity of said filaments, said means comprising a small body of relatively high resistivity material interposed between the filaments and in contact with each.

2. A thermocouple heated by the passage of current therethrough comprising two filaments of different materials capable of forming a thermoelectric junction, a portion of each filament being in close proximity to a corresponding portion of the other filament, and means for concentrating the heating effect of the heating current in the region of proximity of said filaments, said means comprising a small body of relatively high resistivity material in which said filaments are embedded in closely spaced relation.

3. A thermocouple heated by the passage of current therethrough comprising two filaments of different materials capable of forming a thermoelectric junction, and means for concentrating the heating effect of the operating current at a hot junction, comprising a small body of relatively high resistivity material in which said filaments are embedded in closely spaced relation to form said hot junction.

4. A thermocouple heated by the passage of current therethrough comprising two filaments of different metals, means for mounting said filaments with an end of each in closely spaced relation to the end of the other, and means for concentrating the heating effect of the operating current at a hot junction comprising a filament of carbon, bridging the small space between the metal filaments, and completing said hot junction.

5. A thermocouple heated by the passage of current therethrough comprising a filament of nickel-chromium alloy, a filament of gold-palladium alloy, a filament of carbon, means for mounting said alloy filaments in substantially colinear relation with their adjacent ends slightly spaced, said carbon filament being bridged between the adjacent ends of the alloy filaments to form the hot junction of the thermocouple, the carbon filament serving to concentrate the heating effect of the operating current at the hot junction.

6. A thermocouple heated by the passage of current therethrough comprising a filament of nickel-chromium alloy, a filament of gold-palladium alloy, a small body of high resistivity material, and means for supporting the filaments with one end of each adjacent an end of the other, said adjacent ends being embedded in closely spaced relation in said body of high resistivity material, the body completing the hot junction and serving to concentrate the heat of the operating current at said hot junction.

7. A thermocouple heated by the passage of current therethrough comprising a filament of iron, a filament of nickel-copper alloy, a filament of carbon, means for mounting said iron and alloy filaments in substantially colinear relation with their adjacent ends slightly spaced, said carbon filament being bridged between the adjacent ends of the other filaments to form the hot junction of the thermocouple, the carbon filament serving to concentrate the heating effect of the operating current at the hot junction.

8. A thermocouple heated by the passage of current therethrough comprising a filament of iron, a filament of nickel-copper alloy, a small body of high resistivity material, and means for supporting the filaments with one end of each adjacent an end of the other, said adjacent ends being embedded in closely spaced relation in said body of high resistivity material, the body completing the hot junction and serving to concentrate the heat of the operating current at said hot junction.

9. A thermocouple heated by the passage of current therethrough comprising two filaments of different materials capable of forming a thermoelectric junction, a portion of each filament being in close proximity to a corresponding portion of the other filament, and means for concentrating the heating effect of the heating current in the region of proximity of said filaments, said means comprising a small body of finely divided carbon and aluminum oxide in which said filaments are embedded in closely spaced relation.

10. In a thermocouple heated by the passage of current therethrough for measuring high frequency power and comprising two filaments of different material capable of forming a thermoelectric junction, a portion of each filament being in close proximity to a corresponding portion of the other filament, means for increasing the sensitivity of said thermocouple by concentrating the heating effect of the heating current in the region of proximity of said filaments, said means comprising a small body of relatively high resistivity material interposed between the filaments and in contact with each.

JOSEPH A. BECKER.
JOHN N. SHIVE.
THOMAS R. GRIFFITH.

REFERENCES CITED

The following references are of record in the file of this patent:

UNITED STATES PATENTS

| Number | Name | Date |
|---|---|---|
| 836,531 | Pickard | Nov. 20, 1906 |
| 1,920,785 | Ford | Aug. 1, 1933 |
| 2,352,056 | Wilson | June 20, 1944 |

FOREIGN PATENTS

| Number | Country | Date |
|---|---|---|
| 670,851 | France | Aug. 26, 1929 |

OTHER REFERENCES

Kipp et al., Instruments, August 1931, p. 472.